Patented Feb. 20, 1940

2,191,063

UNITED STATES PATENT OFFICE 2,191,063

MANUFACTURE OF ABSORBENT AND ION EXCHANGING MATERIALS

Pieter Smit, Amsterdam, Netherlands, assignor to N. V. Octrooien-Maatschappij "Activit," Amsterdam, Netherlands No Drawing. Application January 10, 1935, Serial No. 1,265. In the Netherlands January 19, 1934

16 Claims. (Cl. 252—2)

My invention relates to manufacture of absorbent and ion exchanging materials; and it comprises a process wherein a carbonaceous material capable of being carbonized by the action of strongly dehydrating chemicals is reacted, usually at temperatures ranging from about 60° to 300° C., with an excess of a strongly dehydrating chemical capable of producing the dehydration-carbonization of said carbonaceous material; said chemical being usually a strong sulfuric acid reagent; and it also includes the carbon zeolites produced in said process, said zeolites having the property of exchanging ions with aqueous solutions contacted therewith; all as more fully hereinafter set forth and as claimed.

My invention provides means whereby there can be prepared, in a particularly simple and effective way, substances of the kind aforesaid which are useful for many purposes and in particular for the removal of dissolved substances from aqueous and other solutions.

Hitherto the so-called activated carbon and other chemically inert substances have been used for decolorizing and deodorizing liquids and solutions, and for the adsorption of gases and vapours therefrom. Activated carbon has been prepared either by the carbonization of carbonaceous materials and activation in contact with suitable gases or vapours, or by impregnating the carbonized substance with chemicals for activation. Carbon has been activated with water vapour, carbon dioxide, chlorine, air, oxygen and other gases or vapours, or it has been impregnated for instance with calcium hydroxide, caustic soda, sulphuric acid, zinc chloride and the like.

The active substances thus prepared were intended to be chemically inert and to this end carbonization of the organic matter was effected at high temperatures.

I have now found that it is possible to produce substances which, being of an acid character, are also chemically active and besides display a great adsorptive and ion-exchanging and fixing capacity. These substances have a character similar to the bodies known as humus, humic acid etc., which are for the greater part of unknown constitution.

The substances obtainable according to this invention are characterized, as distinguished from carbon, by being partly or entirely oxidized in contact with warm dilute nitric acid, and by being partly or entirely soluble in caustic soda solution.

In the preparation of these substances I treat carbonaceous materials, for instance anthracite, sawdust (woodmeal), flour and the like with an excess; that is, with more than an equal weight of a strongly dehydrating reagent capable of producing the dehydration-carbonization of carbonaceous materials, for instance with a mineral acid such as sulfuric acid, pyrosulfuric acid $H_2S_2O_7$, hydrochloric acid, phosphoric acid, or with dehydrating salts, such as zinc chloride or calcium chloride. Strong sulfuric acid reagents, such as the concentrated acid, fuming sulfuric acid and gaseous $SO_3$ are particularly applicable. Care is taken to keep the temperature of the exothermic reaction proceeding within the mixture as low as possible, preferably near 60° C. and in any case not above 300° C. To this end I cool the mass in reaction by artificial means, for instance by spraying water thereon.

Since the humic zeolite produced by this reaction is designed in the first place for use as filtering and ion-exchanging material, care must be taken to make it mechanically strong and resistive in order to enable it, if used in thick layers, to withstand the pressure.

The active principle of the humus-like substances proper can be isolated by extraction with alkali and neutralization. If salts are added to the solution thus obtained, there results a mass which possesses only little activity. If inert and insoluble substances such as for instance carbon, pipe-clay, fuller's earth, calcium phosphates or the like are added to the alkaline solution, which may or may not be neutralized, the active substance will be precipitated on the particles of carbon, pipe-clay or the like and owing to the larger surface over which it is then distributed, its activity may be greatly enhanced.

In practising my invention, I may for instance proceed as follows:

Example 1

Anthracite is subjected during several hours to the action of more than the equivalent proportion of pyrosulfuric acid. The mass under reaction is cooled as described above to keep the temperature within the mass below 250 to 300° C. and as near to 60° as possible. The dark colored product resulting in this treatment resembles the product of the rotting of leaves.

Example 2

Granulated pit-coal is subjected during several hours to the action of more than the equivalent proportion of gaseous sulfuric acid anhydrid ($SO_3$), the mass being cooled to keep the temperature within the mass between 250 and 60° C. and as near as possible to the lower limit. When the reaction has come to an end, the dark-coloured mass is placed in water and acid is removed by washing.

*Example 3*

One part (by weight) starch flour is mixed with 5 to 6 parts fuming sulfuric acid and the mixture is brought to a temperature of about 200° C. by suitably choosing the quantity of acid added at a time and allowing it to act sufficiently long on the carbonaceous substance. It is possible in this manner to dispense with any application of external heat.

*Example 4*

One part by weight very finely ground wood meal is mixed with five parts of a saturated aqueous solution of zinc chloride ZnCl₂. The mixture is heated to about 200° C. The product resulting in the reaction is washed first with hydrochloric acid and thereafter with water and may be granulated by passing it through a sieve.

All the products obtained in the various reactions above described display strong adsorptive and ion-exchanging properties which render them highly useful for many purposes and more particularly for water purification.

Various changes may be made in the details disclosed in the foregoing specification without departing from the invention or sacrificing the advantages thereof.

Processes utilizing humic zeolites produced as above described are described and claimed in my companion application Serial No. 1266.

I claim:

1. In the manufacture of ion exchanging materials, the process which comprises treating a solid carbonaceous material with more than an equal weight of a strongly dehydrating reagent, capable of producing the dehydration-carbonization of said carbonaceous material, said reagent reacting upon the material at a temperature not substantially exceeding 300° C. to form acidic humic compounds, to produce a humic product having ion exchanging properties suitable for conditioning water.

2. In the manufacture of ion exchanging materials, the process which comprises reacting a solid carbonaceous material, capable of being carbonized by dehydration, with more than an equal weight of a concentrated sulfuric acid reagent and at a temperature ranging from about 60° to 300° C. to form acidic humic compounds to produce a humic product having ion exchanging properties suitable for conditioning water.

3. In the manufacture of ion exchanging materials, the process which comprises reacting a solid carbonaceous material, capable of being carbonized by strong dehydrating agents, with at least an equal weight of a strong sulfuric acid reagent at a temperature ranging from about 60° to 300° C. to form humic compounds, washing to remove excess acid and distributing the resulting humic product upon an inert carrier.

4. As ion exchange material prepared for conditioning water by cation exchange, water insoluble material comprising the products obtained by reacting a solid carbonaceous material capable of being carbonized by dehydration with more than an equal weight of a concentrated sulfuric acid reagent at an elevated temperature not substantially exceeding 300° C. to form acidic humic compounds, said products having high absorptive and ion exchanging properties and being characterized by being at least partly oxidized by dilute nitric acid and being at least partly soluble in caustic soda solution.

5. As an ion exchanging material adapted for the softening of water, the reaction product of starch with more than an equal weight of a concentrated sulfuric acid reagent at a temperature ranging from about 60° to 300° C. forming humic substances, said reaction product being a carbonaceous product characterized by having high absorptive and ion exchanging properties, by being at least partly oxidized by dilute nitric acid and at least partly soluble in caustic soda solution.

6. As an ion exchanging material prepared for conditioning water by cation exchange, the reaction product of a solid carbonaceous material with more than an equal weight of a substantially anhydrous sulfuric acid at a temperature ranging from about 60° to 300° C. forming humic substances, said reaction product being a carbonaceous product characterized by being at least partly oxidized by dilute nitric acid and at least partly soluble in caustic soda solution.

7. As an ion exchanging material adapted for the softening of water, the reaction product of finely ground wood meal with more than equivalent weight of zinc chloride in aqueous solution at a temperature ranging from about 60° to 300° C. forming humic substances, said reaction product being a humic product characterized by being at least partly oxidized by dilute nitric acid and at least partly soluble in caustic soda solution.

8. In the manufacture of ion exchanging materials, the process which comprises reacting wood meal with more than an equal weight of zinc chloride at temperatures not substantially exceeding 300° C. and under conditions forming humic compounds, thereby producing a humic product having ion exchanging properties, and washing the reaction product.

9. In the manufacture of ion exchanging materials, the process which comprises reacting starch flour with more than an equal weight of fuming sulfuric acid at temperatures not substantially exceeding 300° C. and under conditions forming acidic humic substances, thereby producing a humic product having ion exchanging properties, and washing the reaction product with water.

10. A process which comprises treating a solid carbonaceous material capable of being carbonized by dehydration with more than an equal weight of a substantially anhydrous sulfuric acid at an elevated temperature not substantially exceeding 300° C. to produce a water insoluble product having a high ion exchange capacity, and washing said product with water to remove excess reagent and produce a material useful in purifying water by ion-exchange.

11. A method as defined in claim 1 in which the dehydrating agent is zinc chloride.

12. A method as defined in claim 1 in which the dehydrating agent is phosphoric acid.

13. As an article of manufacture, a carbonaceous ion exchange material prepared for the treatment of water to exchange cations for the cations of salts dissolved in the water, said material comprising a water insoluble carbonaceous product resistant to repeated regeneration with dilute acid and obtained by treating a solid carbonizable material with more than an equal weight of a strong dehydrating agent capable of producing the dehydration-carbonization of said material, at an elevated temperature not substantially exceeding 300° C., said ion exchange material having a high capacity for ion exchange and being characterized by being at least partly oxidized in contact with warm dilute nitric acid and being at least partly soluble in caustic soda solution.

14. An article of manufacture as defined in claim 13 in which the product is obtained by treating starch.

15. A product as defined in claim 13 which is prepared with zinc chloride as the dehydrating agent.

16. A product as defined in claim 13 which is prepared with phosphoric acid as the dehydrating agent.

PIETER SMIT.